US009876838B2

(12) United States Patent
Li et al.

(10) Patent No.: US 9,876,838 B2
(45) Date of Patent: Jan. 23, 2018

(54) DYNAMIC CODEC NEGOTIATION

(71) Applicant: Verizon Patent and Licensing Inc., Basking Ridge, NJ (US)

(72) Inventors: Yuk Li, Morganville, NJ (US); Gerardo S. Libunao, Manalapan, NJ (US); Jun Yuan, Cranbury, NJ (US); Ratul K. Guha, Kendall Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 303 days.

(21) Appl. No.: 14/728,597

(22) Filed: Jun. 2, 2015

(65) Prior Publication Data
US 2016/0359942 A1  Dec. 8, 2016

(51) Int. Cl.
*H04L 29/06* (2006.01)

(52) U.S. Cl.
CPC .............. *H04L 65/80* (2013.01); *H04L 65/10* (2013.01); *H04L 65/1069* (2013.01)

(58) Field of Classification Search
CPC .......... H04L 7/00–7/0008; H04L 12/00; H04L 12/16–12/18; H04L 12/1813–12/1831; H04L 12/1863; H04L 12/1868; H04L 12/50; H04L 29/00–29/06027; H04L 29/06176; H04L 29/06353; H04L 41/00; H04L 41/08–41/0806; H04L 41/0813–41/0816; H04L 41/0836; H04L 29/0604; H04L 29/06183–29/06204; H04L 29/06319; H04L 29/06476–29/06523; H04L 29/06537; H04L 65/00; H04L 65/10–65/1009
See application file for complete search history.

(56) References Cited

U.S. PATENT DOCUMENTS

| 6,373,839 B1* | 4/2002 | Clark .................... H04L 29/06 370/263 |
| 6,603,774 B1* | 8/2003 | Knappe ................ G10L 19/167 370/352 |
| 6,798,786 B1* | 9/2004 | Lo ........................ H04L 12/6418 370/329 |
| 7,512,118 B1* | 3/2009 | Stephens ............. H04L 65/1069 370/352 |

(Continued)

OTHER PUBLICATIONS

Codec negotiation—3GPP TS 23.153 v.8.3.0, LTE, Mar. 2009.*
Andrew Prokop, Understanding Avaya Codec Selection, SIP Adventures, Oct. 2014.*

*Primary Examiner* — Tauqir Hussain
*Assistant Examiner* — Boris Grijalva Lobos

(57) ABSTRACT

A method, a device, and a non-transitory storage medium having instructions to store data that provides mappings between criteria information and lists of codecs; receive an indication that one of an audio session, a video session, or an audio and video session is to be initiated with another device; obtain one or more criteria metric values in response to a receipt of the indication; select one of the lists of codecs from the data based on one of the mappings and the one or more criteria metric values; transmit the one of the lists of codecs to the other device via a wireless network; receive a response, via the wireless network, from the other device, wherein the response indicates one of the codecs; and use the one of the codecs during the one of the audio session, the video session, or the audio and video session.

20 Claims, 13 Drawing Sheets

(56) References Cited

U.S. PATENT DOCUMENTS

| | | | | |
|---|---|---|---|---|
| 8,150,334 B2* | 4/2012 | Albertsson | .............. | H04W 4/10 |
| | | | | 455/518 |
| 8,248,935 B2* | 8/2012 | Roβler | ................ | H04M 1/2535 |
| | | | | 370/232 |
| 9,356,987 B2* | 5/2016 | Coulombe | ............ | H04L 65/607 |
| 2004/0264470 A1* | 12/2004 | Sirbu | ...................... | H04L 69/24 |
| | | | | 370/395.2 |
| 2006/0159124 A1* | 7/2006 | Henry | ................... | H04M 7/006 |
| | | | | 370/468 |
| 2007/0281681 A1* | 12/2007 | Holm | ........................ | B66B 1/40 |
| | | | | 455/422.1 |
| 2008/0008312 A1* | 1/2008 | Ganesamoorthi | ... | H04M 7/0072 |
| | | | | 379/399.02 |
| 2008/0270457 A1* | 10/2008 | Zilbershtein | .......... | H04M 3/533 |
| 2009/0076802 A1* | 3/2009 | Witzel | ................ | H04W 88/181 |
| | | | | 704/201 |
| 2009/0097475 A1* | 4/2009 | Seon | ................... | H04M 7/0072 |
| | | | | 370/352 |
| 2012/0044817 A1* | 2/2012 | Harper | ................ | H04L 41/0896 |
| | | | | 370/252 |
| 2014/0056296 A1* | 2/2014 | Madabhushi | ....... | H04M 7/0072 |
| | | | | 370/352 |
| 2015/0201041 A1* | 7/2015 | Wang | ................. | H04M 7/0072 |
| | | | | 709/203 |
| 2016/0119384 A1* | 4/2016 | Karimli | .............. | H04L 43/0829 |
| | | | | 370/252 |

\* cited by examiner

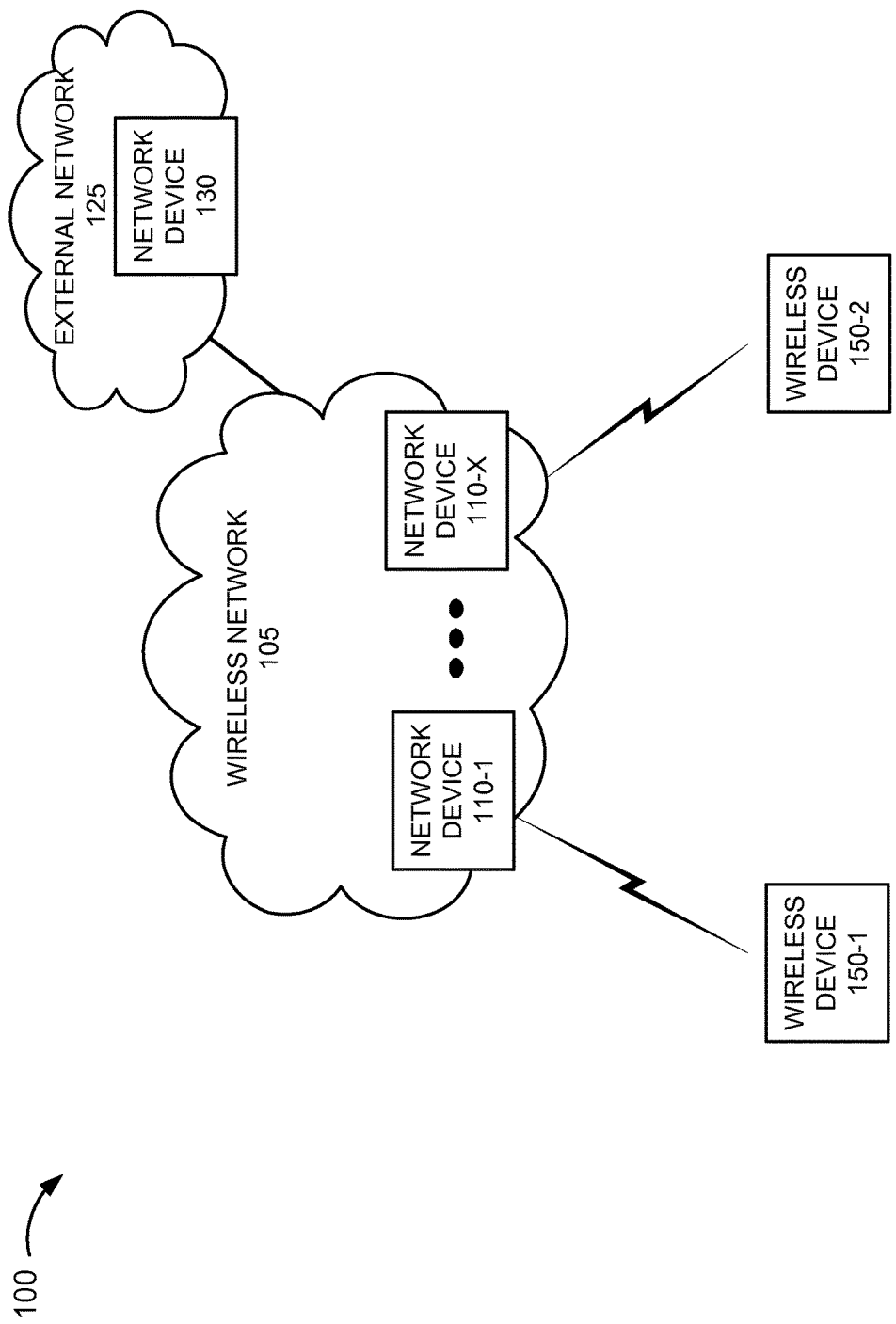

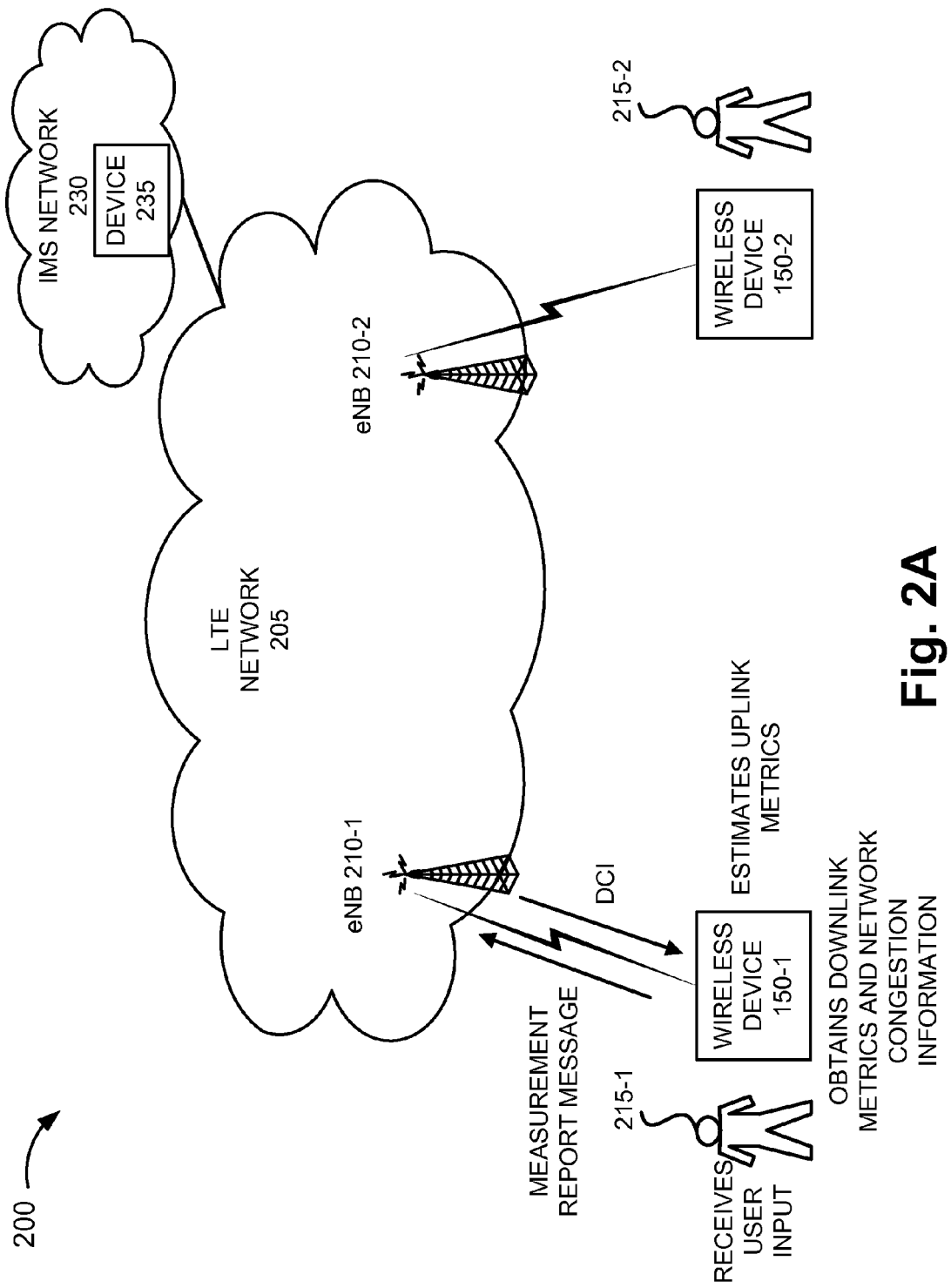

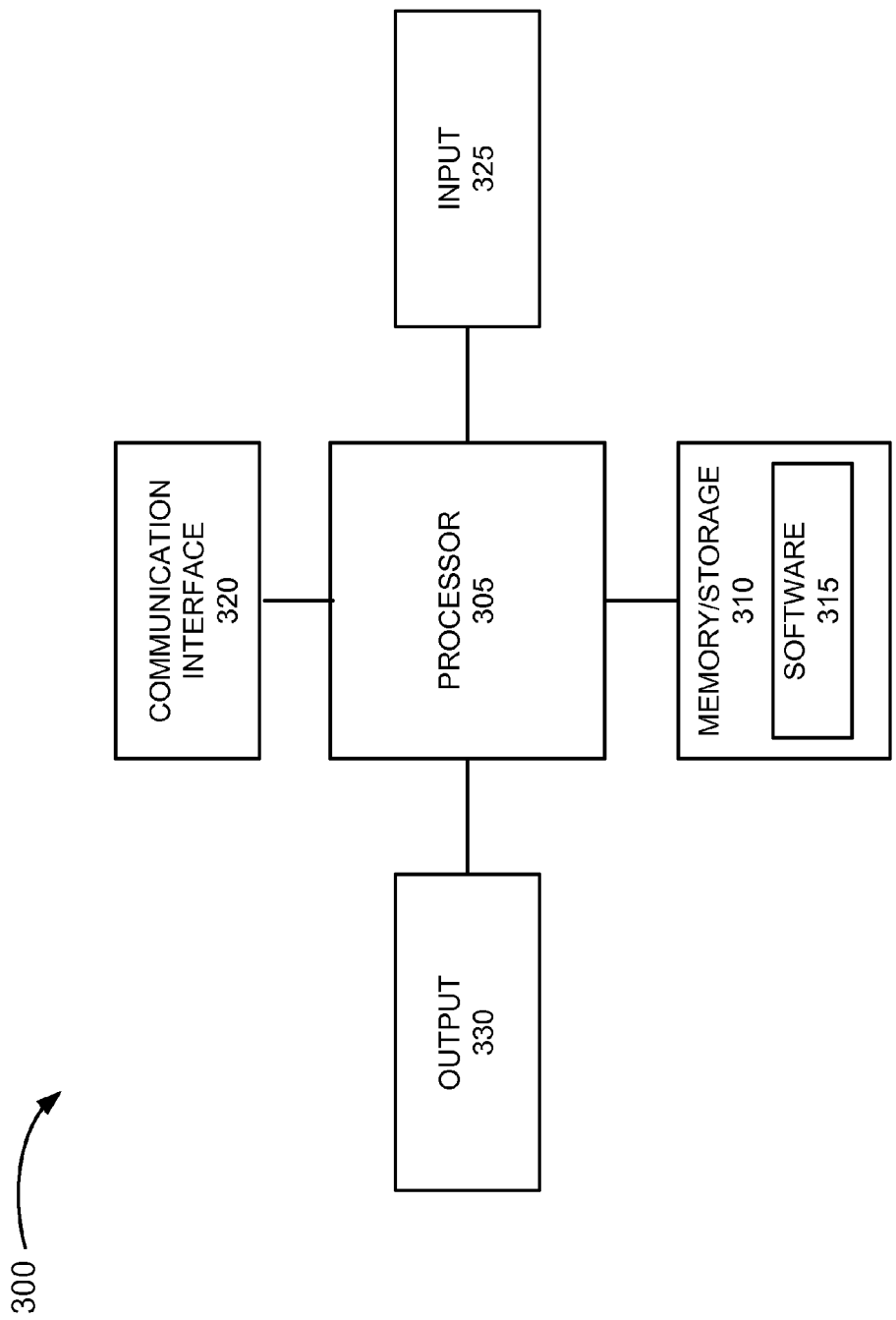

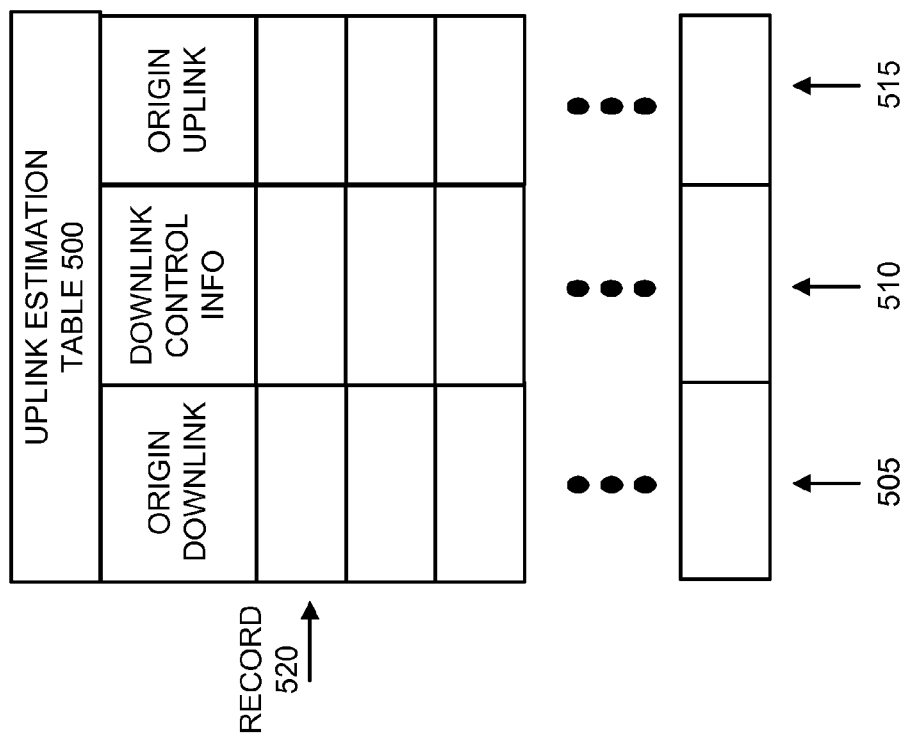

DYNAMIC CODEC NEGOTIATION

BACKGROUND

An enhanced voice services (EVS) codec has been finalized for voice services over Long Term Evolution (LTE) and other radio access technologies standardized by the 3$^{rd}$ Generation Partnership Group (3GPP). The EVS codec includes various features such as a multi-rate audio codec and a channel-aware mode. Additionally, the EVS codec provides interoperation with the Adaptive Multi-Rate Wideband (AMR-WB) codec.

BRIEF DESCRIPTION OF THE DRAWINGS

FIG. 1 is a diagram illustrating an exemplary environment in which exemplary embodiments of dynamic codec negotiation may be implemented;

FIGS. 2A-2F are diagrams that illustrate exemplary processes pertaining to dynamic codec negotiation;

FIG. 3 is a diagram illustrating exemplary components of a device that may correspond to one or more of the devices in the exemplary environments illustrated in FIG. 1 and FIGS. 2A-2F;

FIG. 5 is a diagram illustrating an exemplary table used to estimate uplink conditions.

DETAILED DESCRIPTION OF PREFERRED EMBODIMENTS

Figure 2B:
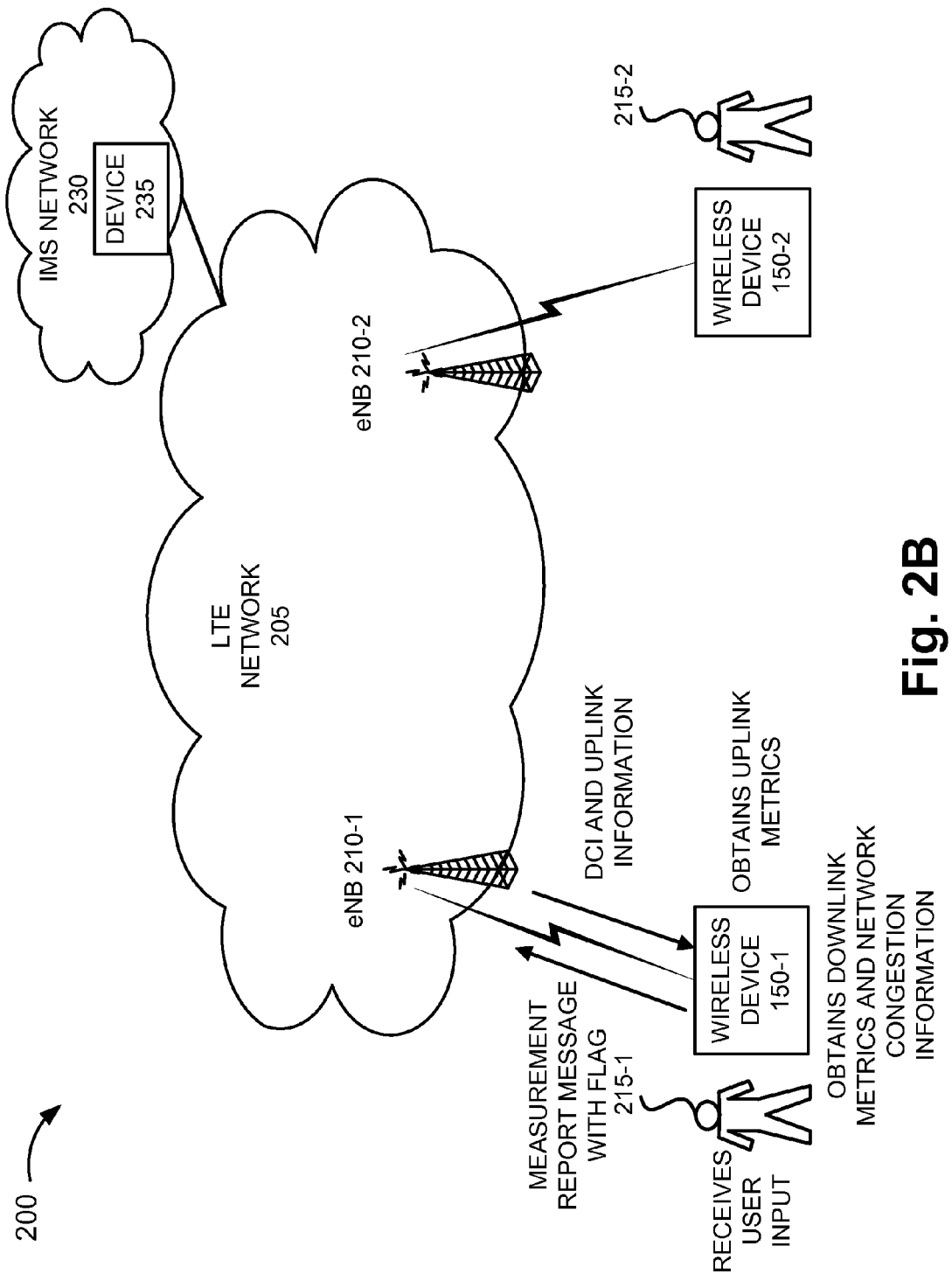

The following detailed description refers to the accompanying drawings. The same reference numbers in different drawings may identify the same or similar elements. Also, the following detailed description does not limit the invention.

According to one approach, a wireless device, such as a user equipment (UE), will negotiate codec settings with another UE via a wireless network (e.g., LTE). For example, the UE (e.g., a mobile originated (MO) device) transmits a Session Initiation Protocol (SIP) INVITE and a Session Description Protocol (SDP) offer to the other UE (e.g., a mobile terminated (MT) device). The SIP INVITE and SDP offer may include a list of preferred codecs settings. Typically, the list of preferred codec settings is a static list. That is, the list includes a pre-defined set of codecs that are the same regardless of wireless conditions (e.g., channel conditions, etc.), wireless network state (e.g., congestion level, etc.), etc. In response to receiving the SIP INVITE and SDP offer, the other UE has the option to select one codec from the list or end the negotiation when the other UE cannot support any of the codecs listed.

When the other UE selects one of the codecs from the list, the wireless network will honor the channel capacity pertaining to the negotiated codec setting. When wireless network conditions degrade, for example, there is an option that a lower bit rate of the codec may be used. The wireless network will try to ensure a channel condition sufficient to not have a dropped session (e.g., a dropped call) by using various techniques, such as Transmission Time Interval (TTI) bundling at a cell edge. However, depending on the characteristics of the change of condition (e.g., rate of change, degree of change, etc.), the session may drop before a different bit rate can be used.

Also according to one approach, the wireless network may override a codec selection in the case of a UE that is roaming and interoperating with another carrier. However, the wireless network may select a particular codec according to a pre-configured network policy.

While such an approach provides a framework to initiate and maintain a session using a particular codec, this type of approach may not be optimal since the list of codecs negotiated is static and wireless conditions in the wireless network and relative to the UE are not. Additionally, when the wireless network selects the codec, similar issues may arise due to the static policy of codec selection.

The term "codec" is intended to include an audio codec, a video codec, and/or an audio and video codec. While particular codec standards are mentioned in this description, an exhaustive treatment of available codecs is beyond the scope of this description. In this regard, exemplary embodiments of dynamic codec negotiation, as described herein, may be implemented using codecs which may not have been specifically described herein. Additionally, while exemplary embodiments described may be implemented based on the use of a particular protocol and/or message, such implementations are not intended to be restrictive or provide an exhaustive treatment, as such. In other words, the embodiments described herein may be implemented using other suitable protocols and/or messages which may not be specifically described herein.

According to an exemplary embodiment, a UE selects a list of codecs based on one or multiple criteria. According to an exemplary implementation, the list of codecs is selected based on a state of the wireless network state. According to an exemplary implementation, a wireless station (e.g., evolved Node B (eNB)) transmits the congestion state of the wireless network, which is carried by a System Information Block (SIB) notification, to the UE.

Additionally, or alternatively, according to an exemplary embodiment, the UE selects the list of codecs based on wireless conditions between the UE and the wireless network. For example, the UE measures the connection state (e.g., downlink conditions) between the wireless station and the UE, such as power (e.g., Received Signal Strength Indicator (RSSI), Reference Signal Received Power (RSRP)), quality (e.g., Reference Signal Received Quality (RSRQ), etc.), and error rate (e.g., Frame Error Rate (FER), Block Error Rate (BLER), Speech Error Rate (SER), etc.).

Additionally, or alternatively, according to an exemplary embodiment, the UE selects the list of codecs based on wireless conditions between the wireless network and the UE. According to an exemplary implementation, the UE estimates the connection state (e.g., uplink conditions) based on the connection state between the UE and the wireless network (e.g., downlink conditions) and downlink control information (DCI) (e.g., a power control command; uplink modulation and coding scheme (MCS), etc.) from a network device of the wireless network. According to another exemplary implementation, the UE receives an uplink metric value (e.g., a signal-to-interference-plus-noise ratio (SINR), a received signal strength indicator (RRSI), etc.) from the network device of the wireless network.

Additionally, or alternatively, according to an exemplary embodiment, the UE selects the list of codecs based on a codec preference of the wireless network(s) to which an originating UE and/or a terminating UE is/are attached. For example, an originating UE may store a list of codecs pertaining to one or multiple network types (e.g., a Long Term Evolution (LTE) network, a Code Division Multiple Access (CDMA) network, a Wideband CDMA network, etc.) and/or one or multiple wireless network service providers (e.g., Verizon, AT&T, etc.). Additionally, or alternatively, the originating UE obtains a codec preference of the wireless network to which the terminating UE. Additionally, or alternatively, the originating UE obtains other criteria from the terminating UE perspective (e.g., downlink conditions, network state, etc.).

As previously described, according to an exemplary embodiment, the UE selects the list of codecs based on various criteria, such as wireless network state, uplink connection state, downlink connection state, and/or network preference. According to an exemplary embodiment, the UE selects the list of codecs based on a mapping between the criteria and a set of codec lists. Additionally, since one codec may have a different set of characteristics compared to another codec, the granularity of the mapping of criteria and lists may vary between different codec standards (Adaptive Multi-Rate (AMR), Enhanced Voice Services (EVS), etc.), modes provided and/or characteristics afforded by a particular codec standard, such as bandwidth (e.g., wideband, narrowband, super wideband, etc.), bitrate, error rate, frequency range, sampling rate, etc.

According to an exemplary embodiment, the mapping of the criteria to a codec list is based on an evaluation process. For example, according to an exemplary implementation, the UE compares the value of each criteria to a threshold value pertaining to that criteria. For example, the UE obtains an RSRP value through measurement and compares that RSRP value to a threshold RSRP value (e.g., a single value or a range of values) with respect to one or multiple entries. Additionally, the UE obtains other values pertaining to other downlink metrics. Based on the results of the comparisons, the UE selects a codec list that is mapped to the results of the comparisons. According to an exemplary embodiment, the codec list indicates multiple codecs and their corresponding attributes (e.g., bandwidth, etc.).

According to an exemplary embodiment, the UE selects the codec list based on other criteria not previously mentioned. According to an exemplary embodiment, the UE selects the codec list based on the category of the session. For example, depending on whether the UE is initiating an audio session, a video session, or an audio and video session, the UE selects a codec based on the category of the session. Additionally, or alternatively, the UE selects the codec list based on a type of session within a category. For example, depending on whether the audio session is a voice session or a music session, the UE may select one codec list over another codec list. By way of example, the bandwidth of the codec may be narrow for a voice session compared to music session. Additionally, or alternatively, other characteristics of the codec (e.g., error correction, etc.) may be preferred depending on whether the audio session is a voice session versus a music session.

FIG. 1 is a diagram illustrating an exemplary environment 100 in which exemplary embodiments of dynamic codec negotiation may be implemented. As illustrated, environment 100 includes a wireless network 105 and an external network 125. As further illustrated, environment 100 includes a wireless device 150-1 and a wireless device 150-2 (also referred to collectively as wireless devices 150 and generally or individually as wireless device 150).

Environment 100 may be implemented to include wireless connections between wireless devices 150 and wireless network 105. A connection may be direct or indirect and may involve an intermediary device and/or an intermediary network not illustrated in FIG. 1. Additionally, the number and the arrangement of the connection between wireless device 150 and wireless network 105 are exemplary.

Wireless network 105 includes one or multiple wireless networks of one or multiple types. Wireless network 105 may be implemented using various wireless architectures, standards, and/or technologies. For example, wireless network 105 may include a cellular network, such as a $3^{rd}$ Generation (3G) network, a 3.5G network, a 4G network, etc. By way of further example, wireless network 105 may be implemented to include an LTE network, a Universal Mobile Telecommunications System (UMTS) network, a Global System for Mobile Communications (GSM) network, a Wideband Code Division Multiple Access (WCDMA) network, an Ultra Mobile Broadband (UMB) network, a High-Speed Packet Access (HSPA) network, an Evolution Data Optimized (EV-DO) network, a Worldwide Interoperability for Microwave Access (WiMAX) network, and/or another type of wireless network (e.g., an LTE Advanced network, a future generation wireless network architecture, etc.).

Network device 110-1 through network device 110-X (also referred to network devices 110 or generally as network device 110), in which X>1, each includes a wireless communication device. For example, network device 110 may be implemented as a network device 110 that provides access to wireless network 105. By way of example, network device 110 may be implemented as a base station, a base station controller, an eNB, a home eNB, a home Node B, a pico base station, a femto device, a base transceiver station, a user device gateway, a radio node, an anchor point, a wireless router, etc.

Given the wide variety of wireless networks that may be implemented in various embodiments, wireless network 105 may include other types of network devices, such as a wireless relay node, a repeater, a network device that pertains to billing, security (e.g., a firewall, etc.), authentication and authorization, network policies, providing a service or an asset, providing access to another network, a serving gateway (SGW), etc. A network device may support one or multiple access and/or wireless technologies.

External network 125 includes one or multiple networks of one or multiple types. For example, external network 125 may be implemented as a service or application-layer network, the Internet, an Internet Protocol Multimedia Subsystem (IMS) network, a proprietary network, a cloud network, a data network, etc. External network 125 may include a network device 130 that provides an application or a service, such as a web server, a communication server (e.g., video telephony, Voice over Internet Protocol (VoIP), Voice over LTE (VoLTE)), a media streaming service, etc., or other type of application or service in which an audio session, a video session, or an audio and video session may be established with wireless device 150 and a codec used.

Wireless device 150 includes a device with wireless communicative capabilities. Wireless device 150 may be a mobile device. For example, wireless device 150 may be implemented as a smartphone, a tablet device, a netbook, a vehicular communication system within a vehicle, a computer, a wearable device (e.g., a watch, glasses, etc.), a music playing device, a location-aware device, or other mobile, wireless device. Alternatively, wireless device 150 may be a non-mobile (e.g., stationary) device. For example, wireless device 150 may be implemented as a kiosk, a point of sale terminal, a vending machine, a set top box, a smart television, etc. According to an exemplary embodiment, wireless device 150 includes a dynamic codec component. The dynamic codec component provides a dynamic codec service, as described herein.

An exemplary embodiment of dynamic codec negotiation is described further below in relation to FIGS. 2A-2E. FIG. 2A illustrates an exemplary environment 200 in which an exemplary embodiment of dynamic codec negotiation may be implemented. As illustrated, environment 200 includes an LTE network 205, which is an exemplary implementation of wireless network 105, and an eNB 210-1 and an eNB 210-2, which are an exemplary implementation of network devices 110. Additionally, environment 200 includes an IMS network 230, which is an exemplary implementation of external network 125, and a device 235, which is an exemplary implementation of network device 130. For example, device 235 may be a telephony application server. As further illustrated, environment 200 includes wireless devices 150.

It may be assumed, although not illustrated, that other network elements (e.g., a packet data network gateway (PGW), a SGW, a mobility management entity (MME), etc.) exist in LTE network 205, but have been omitted for purposes of brevity. Although environment 200 includes one network of a specific type (e.g., LTE), according to other embodiments, dynamic codec negotiation may be implemented in an environment that includes multiple networks, which may be of the same type or of a different type.

According to an exemplary embodiment, wireless device 150 is pre-configured with codec lists that are mapped to criteria. The dynamic codec component of wireless device 150 selects a codec list based on the mapping between the criteria and codec lists.

Referring to FIG. 2A, according to an exemplary scenario, assume a user 215-1 operates wireless device 150-1 and a user 215-2 operates wireless device 150-2. Assume wireless device 150-1 is attached to and registered with (e.g., camped) LTE network 205 via eNB 210-1, and wireless device 150-1 is similarly camped with LTE network 205 via eNB 210-2. Additionally, wireless device 150-1 and wireless device 150-2 each registers with IMS network 230. For example, wireless device 150-1 and wireless device 150-2 performs a Proxy-Call Session Control Function (P-CSCF) discovery and registration process.

Thereafter, user 215-1 initiates a VoLTE call, via wireless device 150-1, to wireless device 150-2 and user 215-2. For example, user 215-1 may open a voice application on wireless device 150-1. In response to the input of user 215-1, the dynamic codec component of wireless device 150-1 obtains downlink metrics from a wireless communication interface of wireless device 150-1. For example, wireless device 150-1 performs downlink measurements and the dynamic codec component obtains and stores downlink metric values via a modem. The dynamic codec component also obtains congestion information pertaining to LTE network 205 based on wireless device 150-1 listening to a System Information Block Type 2 message.

As further illustrated in FIG. 2A, wireless device 150-1 transmits a measurement report message to eNB 210-1. In response to receiving the measurement report or based on a standard downlink control information (DCI) messaging carried in the physical downlink control channel (PDCCH), eNB 210-1 transmits downlink control information (DCI). By way of further example, the DCI information may indicate resource blocks, a modulation and coding scheme (MCS), and uplink (UL) power control directed to wireless device 150-1. Based on the downlink measurements and the DCI information, according to an exemplary implementation, wireless device 150-1 estimates the uplink conditions.

For example, the dynamic codec component may reference an uplink estimation table 500, as illustrated in FIG. 5, which is stored by wireless device 150-1. Uplink estimation table 500 stores a mapping between downlink conditions and downlink control information to estimated uplink conditions, as described further below.

Referring to FIG. 5, uplink estimation table 500 includes an origin downlink field 505, a downlink control information field 510, and an origin uplink field 515. The fields illustrated in FIG. 5 and described herein are exemplary. According to other implementations, uplink estimation table 500 may store additional, fewer, and/or different instances of data. For example, according to other exemplary implementations, uplink estimation table 500 may not include origin downlink field 505 or downlink control information field 510.

The selection of downlink information, the data (e.g., threshold values, etc.) included therein for mapping to an estimated uplink conditions, etc., as described in relation to exemplary uplink estimation table 500, may be based on previous measurements, testing, etc., performed by network administrative personnel, etc., as well as wireless communication theory, etc. Additionally, although according to an exemplary implementation, the mapping of criteria to estimated uplink conditions is illustrated and described in relation to a table, the mapping of downlink information to estimated uplink conditions may be implemented in other types of well-known data structures and/or a database.

Origin downlink field 505 stores threshold values pertaining to downlink measurements. For example, origin downlink field 505 stores threshold values pertaining to one or multiple criteria pertaining to downlink conditions, such as power (e.g., RRSI, RSRP), quality (RSRQ), etc., as previously described. Downlink control information field 510 stores threshold values pertaining to downlink control information (e.g., particular modulation and coding schemes (MCSs), transmit power, etc.). Origin uplink field 515 stores estimated threshold values pertaining to uplink conditions from the perspective of an intermediary network device (e.g., eNB 210).

The dynamic codec component uses the measured downlink metric values and the downlink control information compared to the information stored in origin downlink field 505 and downlink control information field 510 to determine which record (e.g., a record 520) in uplink estimation table 500 provides a mapping between downlink conditions and downlink control information to estimated uplink conditions. When the dynamic codec component determines a match or a best-fit, the dynamic codec component may use the origin uplink information stored in origin uplink field 515 of the selected record as a basis for selecting a list of codecs, as described further below.

Referring to FIG. 2B, according to another exemplary scenario and in contrast to FIG. 2A, wireless device 150-1 obtains uplink metrics from eNB 210-1. For example, wireless device 150-1 transmits a measurement report message to eNB 210-1. In contrast to the measurement report message illustrated and described in relation to FIG. 2A, the measurement report message includes a flag or other form of data that indicates to the intermediary network device (e.g., eNB 210-1) to provide uplink condition information. In response to receiving the measurement report message with flag (as illustrated in 2B), eNB 210-1 transmits DCI and uplink information to wireless device 150-1 via the PDCCH. For example, the DCI and uplink message includes downlink control information and uplink metric values. By way of further example, the uplink metric values may include an SINR value, an RSSI value, and/or a channel state indicator (CSI)/precoding matrix indicator (PMI) value. In an LTE context, the eNB typically performs measurements pertaining to these metrics. However, unlike the exemplary implementation described herein, these measurements are not provided to the UE. Nevertheless, since the eNB typically performs such measurements, resource utilization of the eNB in order to provide these uplink metrics to wireless device 150 is minimized since the eNB typically calculates uplink metric values for other reasons (e.g., scheduling, etc.). According to other exemplary implementations, the eNB may be configured to provide additional and/or different uplink metrics to the UE including the physical uplink shared channel (PUSCH) power and uplink SINR.

As previously described, according to an exemplary embodiment, other types of criteria may be used as a basis for selecting a list of codecs. For example, the type of session for which the codec applies may be a consideration. Additionally, or alternatively, a network preference (e.g., LTE network 205 preference) toward one or multiple codecs may also be a consideration. For example, wireless device 150-1 may store network codec preference information.

Figure 2C:
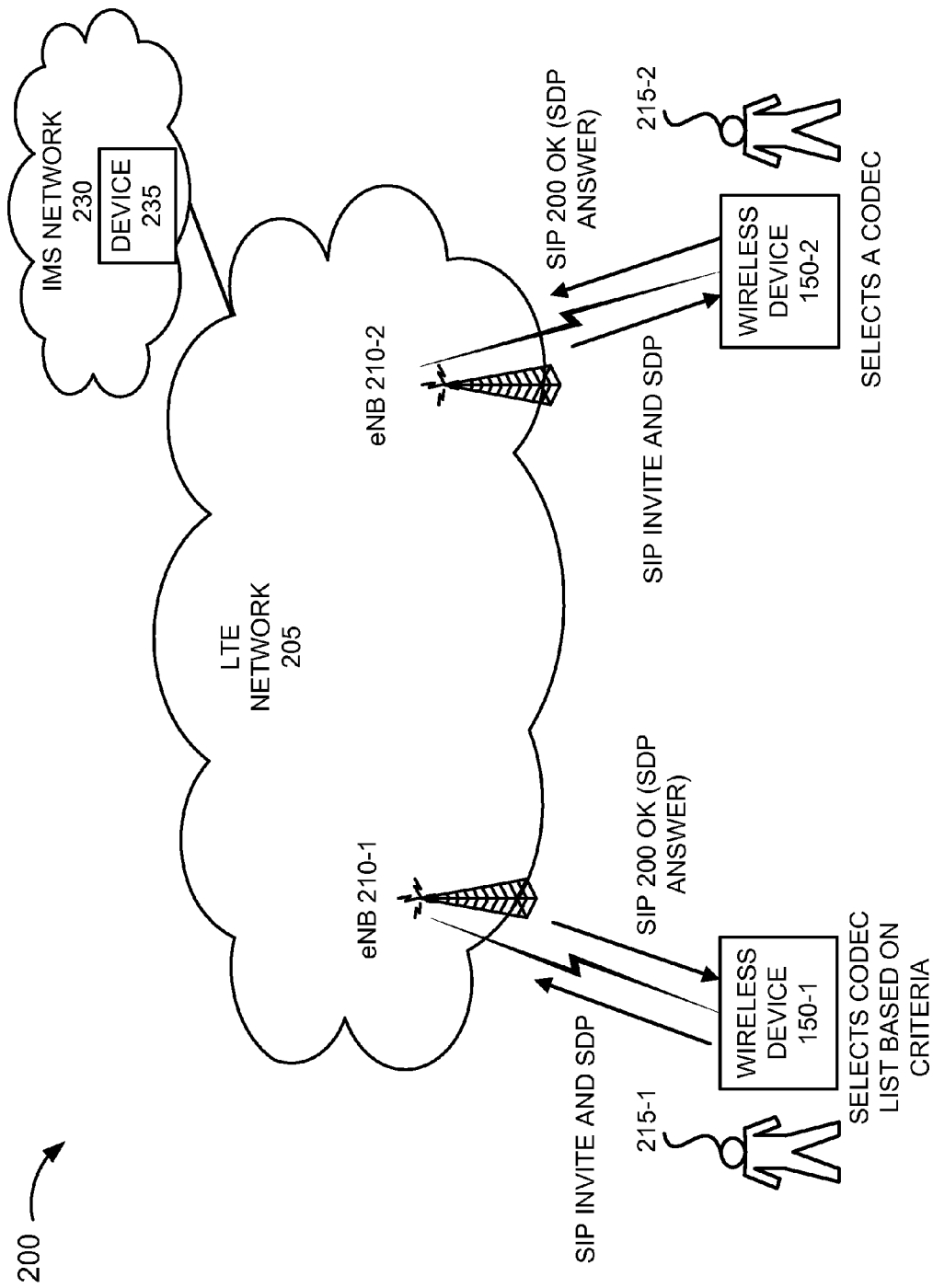
Figure 6:
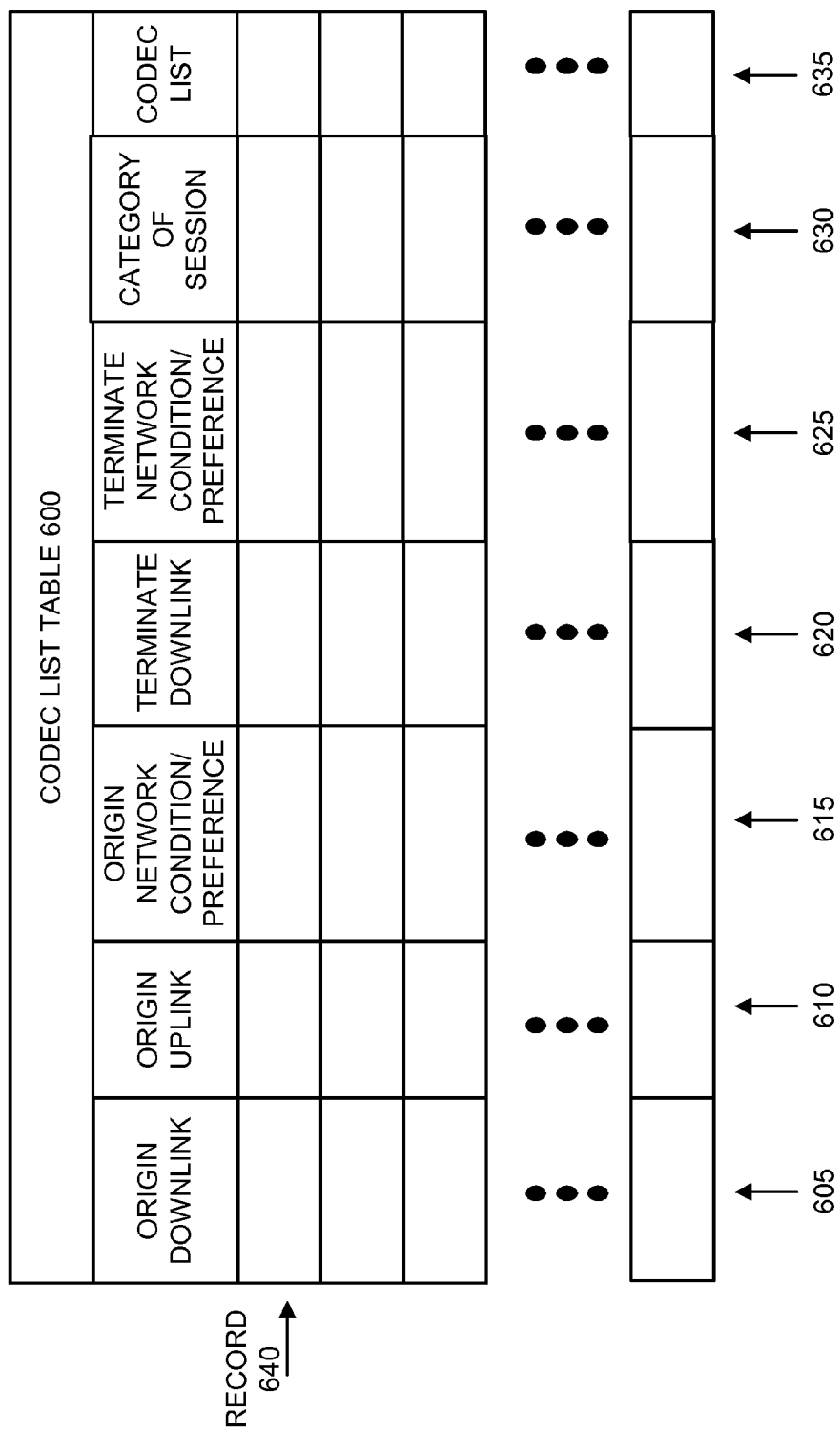
FIG. 6 is a diagram illustrating an exemplary table used to select a list of codecs based on criteria information.

Referring to FIG. 2C, the dynamic codec component of wireless device 150-1 selects a list of codecs based on the accumulated criteria. For example, the dynamic codec component may reference a codec list table 600, as illustrated in FIG. 6, which is stored by wireless device 150-1. Codec list table 600 stores a mapping between criteria and different codec lists, as described further below.

Referring to FIG. 6, codec list table 600 includes an origin downlink field 605, an origin uplink field 610, an origin network condition and/or network preference field 615, a terminate downlink field 620, a terminate network condition and/or network preference field 625, a category of session field 630, and a codec list field 635. The fields illustrated in FIG. 6 and described herein are exemplary. According to other implementations, codec list table 600 may store additional, fewer, and/or different instances of data. For example, according to other exemplary implementations, codec list table 600 may not include field 610, field 615, field 620, field 625, and/or field 630. Additionally, or alternatively, codec list table 600 may include a terminating uplink field (not shown), which includes information analogous to field 610, but from the terminating side perspective.

The selection of criteria, the data (e.g., threshold values, etc.) included therein for mapping, the list of codecs that are mapped to the criteria, etc., as described in relation to exemplary codec list table 600, may be based on previous measurements, testing, etc., performed by network administrative personnel, as well as wireless communication theory, etc. Additionally, although according to an exemplary implementation, the mapping of criteria to a list of codecs is illustrated and described in relation to a table, the mapping of criteria to a list of codecs may be implemented in other types of well-known data structures and/or a database.

Origin downlink field 605 and origin uplink field 610 store information similar to that previously described in relation to origin downlink field 505 and origin uplink field 515 of FIG. 5. Origin network condition and/or network preference field 615 stores a threshold congestion pertaining to a wireless network (e.g., LTE network 205) and/or a codec that is a wireless network preference of the wireless network.

Terminate downlink field 620 is criteria pertaining to a terminating device of the session to which the list of codecs pertains. For example, with reference to FIG. 2A, wireless device 150-2 may provide, to wireless device 150-1, a downlink metric value (e.g., a power value, a quality value, etc.) pertaining to the downlink conditions between wireless device 150-2 and eNB 210-2. An exemplary embodiment of this procedure is described further below.

Terminate network condition and/or network preference field 625 stores information similar to that of origin network condition and/or network preference field 615, except that such information pertains to congestion associated with eNB 210-2 and network preferences thereof. In some cases, wireless device 150-1 and wireless device 150-2 may be camped on the same wireless network 105 (e.g., LTE network 205). However, in other cases, wireless device 150-1 may be camped on LTE network 205, and wireless device 150-2 may be camped on a different wireless network (e.g., a CDMA network (not illustrated), etc.). Wireless device 150-2 may provide this information to wireless device 150-1. An exemplary embodiment of this procedure is also described further below.

Category of session field 630 indicates a category of a session. As previously described, a codec that is included in the list of codecs may be an audio codec, a video codec, or an audio and video codec. In this regard, category of session field 630 may indicate various categories of sessions such as an audio session, a video session, or an audio and video session. Additionally, category of session field 630 may also indicate a particular type of audio session, such as a voice session, a music session, a radio streaming session, etc., or a particular type of application or service (e.g., VoIP, VoLTE, etc.). Similarly, category of session field 630 may indicate a particular type of audio and video session, such as an audio/video conference session, a program session (e.g., downloading or streaming a movie or other types of content available on web sites, etc.), etc.

Codec list field 635 stores a list of codecs that are mapped to criteria values (e.g., fields 605 through 630, or any sub-combination thereof). According to an exemplary implementation, the list of codecs includes a listing of multiple codecs. The codecs may be ordered within the list based on a particular parameter. According to an exemplary implementation, the ordering of codecs may be from the most preferred codec (e.g., from a perspective of the originating wireless device) through a least preferred. According to other exemplary implementations, the ordering of codecs may be based on any other type of parameter (e.g., most-used, most preferred from a perspective of the terminating wireless device, random, wireless conditions and network conditions relative to both originating wireless device and terminating wireless device, etc.).

The dynamic codec component uses the criteria values compared to the information stored in fields 605 through 630, or any sub-combination thereof, to determine which record (e.g., a record 640) in codec list table 600 provides a mapping between the criteria values to a codec list. When the dynamic codec component determines a match or a best-fit, the dynamic codec component may use a codec list stored in codec list field 635 of the selected record.

Referring back to FIG. 2C, the dynamic codec component of wireless device 150-1 selects a list of codecs from codec list table 600. As illustrated, wireless device 150-1 generates and transmits a SIP INVITE and SDP offer that includes the list of codecs selected from codec list table 600. Wireless device 150-1 transmits the SIP INVITE and SDP offer via a default bearer. Wireless device 150-1 also establishes a dedicated bearer for the VoLTE session. Wireless device 150-2 receives the SIP INVITE and SDP offer via device 235 of IMS network 230.

According to an exemplary embodiment, wireless device 150-2 does not provide terminating side information, which was previously described in relation to terminate downlink field 620 and/or terminate network condition and/or network preference field 625, to wireless device 150-1. Rather, a dynamic codec component of wireless device 150-2 selects a codec from the list of codecs included in the SIP INVITE and SDP offer message.

According to another exemplary embodiment, wireless device 150-1 provides information, which was previously described in relation to terminate downlink field 620 and/or terminate network condition and/or network preference field 625, to wireless device 150-1. Each embodiment is described further below.

Referring to FIG. 2C, according to an exemplary embodiment, wireless device 150-2 receives the codec list, but does not provide termination side information. The dynamic codec component of wireless device 150-2 analyzes the codec list and selects a codec from the codec list. According to an exemplary implementation, the dynamic codec component selects the codec from the list of codecs received based on channel conditions and/or other metrics (e.g., network congestion, etc.) pertaining to wireless device 150-2 and supportable by wireless device 150-1. In this regard, the dynamic codec component selects the codec that provides a best-fit or optimal codec supportable by both wireless device 150-1 and wireless device 150-2. By way of example, when the codec list includes codecs that are meant for less than ideal wireless conditions and/or network conditions from the originating side (e.g., wireless device 150-1), and wireless device 150-2 determines that wireless conditions and network conditions from its perspective are ideal, the dynamic codec component selects the most preferred codec listed in the list of codecs, in view of the less than ideal conditions to which wireless device 150-1 is subjected.

Thereafter, wireless device 150-2 generates and transmits a SIP 200 OK message that includes an SDP Answer. The SDP Answer includes data indicating the selected codec. Wireless device 150-1 receives the SIP 200 OK message. Thereafter, wireless device 150-1 and wireless device 150-2 each uses the selected codec during a VoLTE session. For purposes of brevity, other messages (SIP 200 OK (Provisional Response Acknowledgement (PRACK)), SIP 180 (Ringing), a SIP (Acknowledgement (ACK)), etc.) that may be exchanged before the establishment of the VoLTE session have been omitted.

Figure 2D:
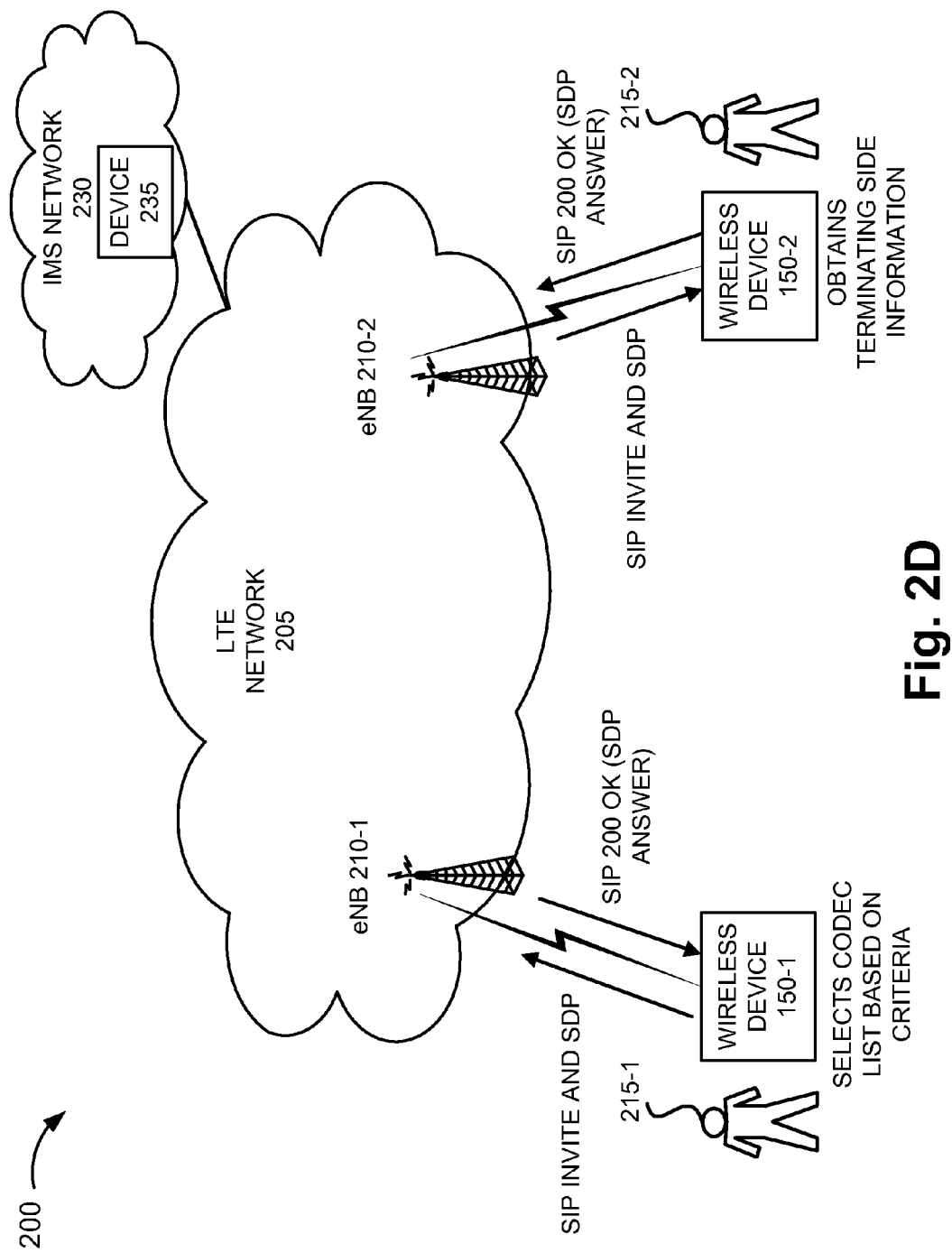

Referring to FIG. 2D, according to an exemplary embodiment, wireless device 150-2 receives the codec list, and in response, obtains terminating side information to provide to wireless device 150-1. For example, wireless device 150-2 measures a downlink metric (e.g., power, quality, etc.) in a manner similar to that previously described in relation to wireless device 150-1. Additionally, or alternatively, wireless device 150-2 obtains congestion information pertaining to LTE network 205 based on wireless device 150-2 listening to a System Information Block Type 2 message. Additionally, or alternatively, wireless device 150-2 may estimate uplink conditions or obtain uplink condition information from eNB 210-2 in a manner similar to that previously described with respect to wireless device 150-1. Additionally, or alternatively, wireless device 150-2 may obtain network codec preference information pertaining to LTE network 205.

Figure 2E:
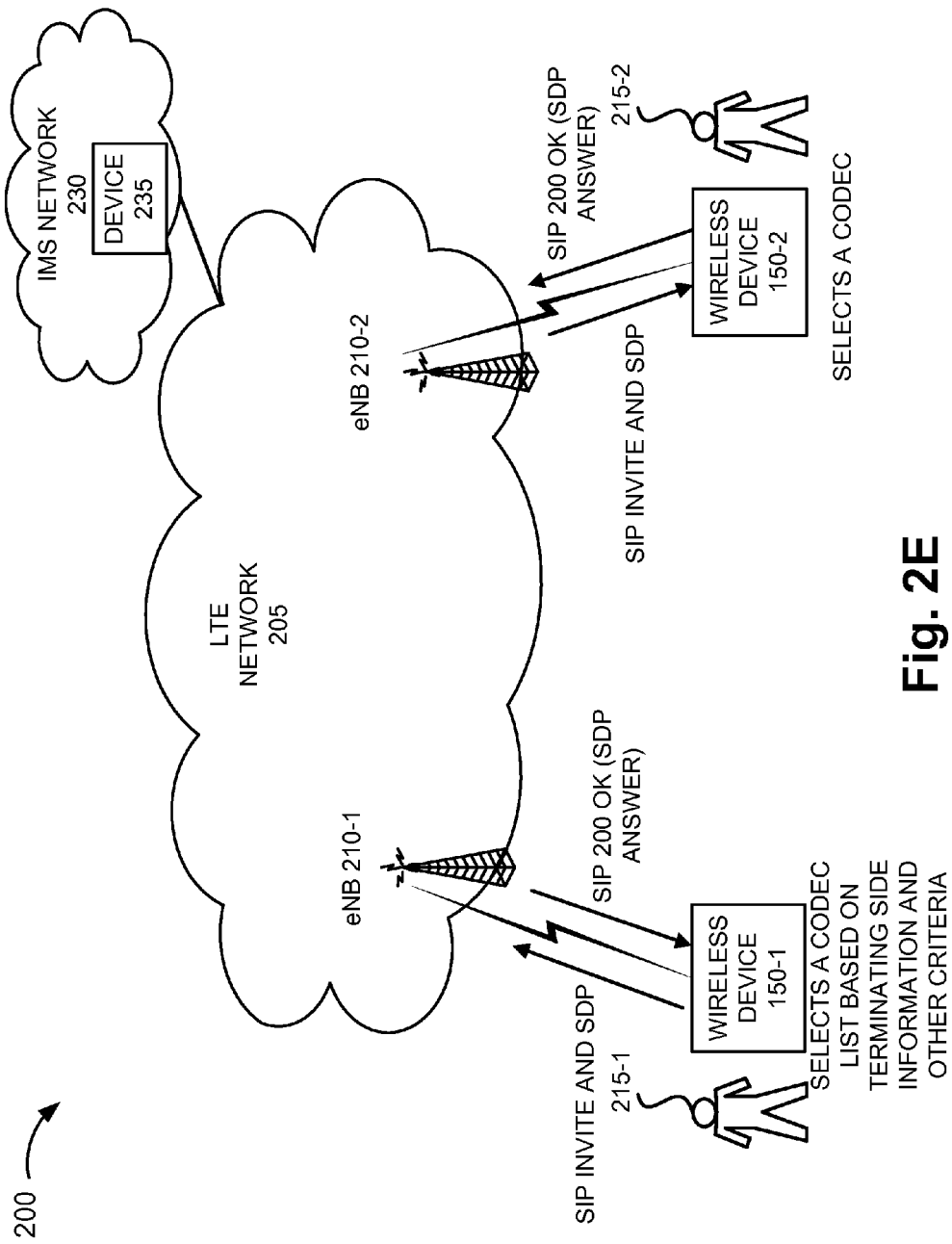

As further illustrated, according to an exemplary implementation, wireless device 150-2 generates and transmits a SIP OK that includes a SDP Answer. The terminating side information may be carried in, for example, a header of the SIP OK message, or other suitable portion of the message (e.g., trailer, a reserved field, etc.). Wireless device 150-1 receives the SIP OK message. Referring to FIG. 2E, the dynamic codec component of wireless device 150-1 selects a list of codecs from codec list table 600 based on the received, terminating side information and other criteria. Wireless device 150-1 generates and transmits another SIP INVITE and SDP offer that includes the list of codecs selected from codec list table 600. Thereafter, the call flow proceeds in a manner similar to that previously described in FIG. 2C.

Figure 2F:
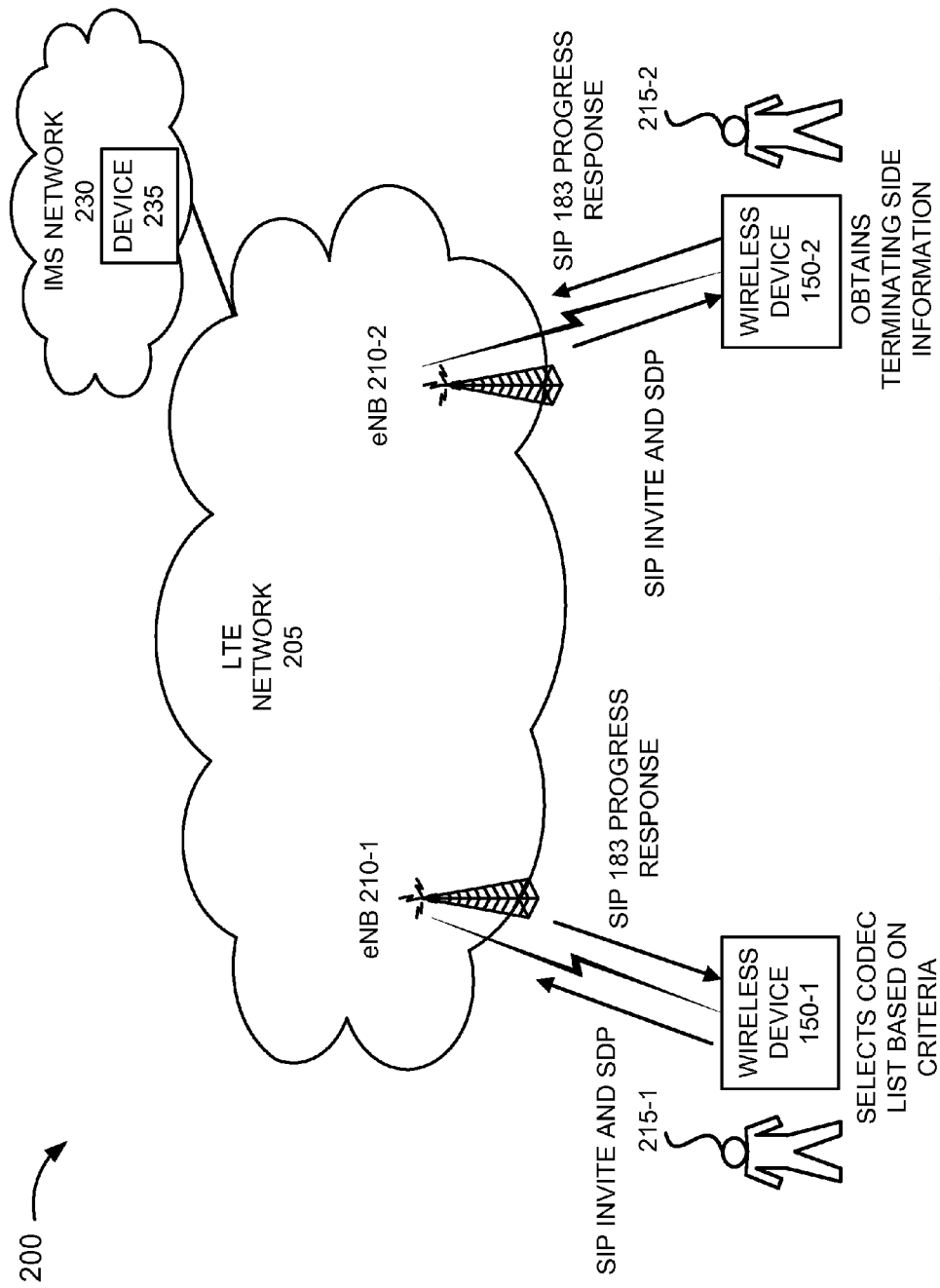

According to another exemplary implementation, as illustrated in FIG. 2F, subsequent to receiving the initial SIP INVITE and SDP offer, wireless device 150-2 generates and transmits a SIP 183 Progress response. The terminating side information may be carried in, for example, a header of the SIP 183 message, or other suitable portion of the message. Wireless device 150-1 receives the SIP 183 message. Thereafter, in a manner similar to that previously described, the dynamic codec component of wireless device 150-1 selects a list of codecs from codec list table 600 based on the received, terminating side information and other criteria. Wireless device 150-1 generates and transmits another SIP INVITE and SDP offer that includes the list of codecs selected from codec list table 600. Thereafter, the call flow proceeds in a manner similar to that previously described in FIG. 2C.

Although FIGS. 2A-2F illustrate exemplary call flows and messaging, according to other implementations, depending on the wireless network, the protocols used, etc., criteria information and/or terminating side information may be carried by messages and/or use of protocols different from those described.

FIG. 3 is a diagram illustrating exemplary components of a device 300 that may correspond to one or more of the devices in the environments described herein. For example, device 300 may correspond to network devices of wireless network 105 and wireless device 150. As illustrated, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a computer program that provides a function and/or a process. Software 315 may include firmware. For example, with reference to wireless device 150, software 315 may include an application that, when executed by processor 305, provides the dynamic codec service, as described herein. Additionally, for example, with reference to network device 110, software 315 may include an application that, when executed by processor 305, provides the dynamic codec service, as described herein. For example, eNB 210-2 may include an application, which when executed, provides uplink conditions to wireless device 150.

Communication interface 320 permits device 300 to communicate with other devices, networks, systems, etc. Communication interface 320 may include one or multiple wireless interfaces and/or wired interfaces. Communication interface 320 may include one or multiple transmitters and receivers or transceivers. Communication interface 320 may include one or multiple antennas. Communication interface 320 may operate according to a protocol and a communication standard.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 may cause processor 305 to perform a process described herein. Alternatively, for example, according to other implementations, device 300 may perform a process described herein based on the operation of hardware (processor 305, etc.).

Figure 4A:
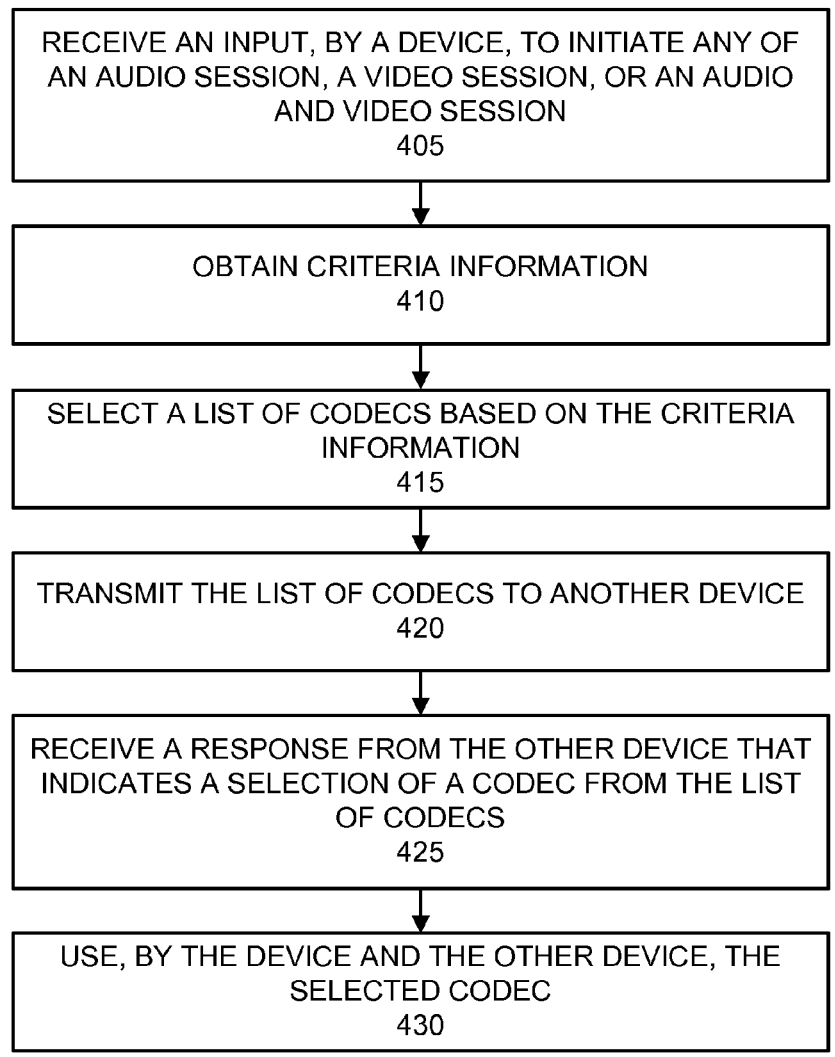
FIG. 4A is a flow diagram that illustrates an exemplary process pertaining to dynamic codec negotiation.

FIG. 4A is a flow diagram that illustrates an exemplary process 400 pertaining to dynamic codec negotiation. Process 400 is directed to a process previously described above with respect to FIGS. 2A-2C and elsewhere in this description, in which a list of codecs is selected based on various criteria for presentment to a device during a codec negotiation. For example, process 400 is directed to an exemplary embodiment in which dynamic codec negotiation is performed without receiving terminating side information. According to an exemplary embodiment, wireless device 150 performs the steps described in process 400. For example, processor 305 may execute software 315 to provide a dynamic codec service.

Referring to FIG. 4A, process 400 may begin, in block 405, with receiving an input, by a device, to initiate any of an audio session, a video session, or an audio and video session. For example, a triggering event is received by a wireless device 150 to initiate a session. According to an exemplary implementation, the triggering event is user-initiated. By way of further example, the user may initiate a session, via wireless device 150, to start a session with another end user device (e.g., wireless device 150) or a network device (e.g., a media server, etc.). The dynamic codec component of wireless device 150 may identify that any of an audio session, a video session, or an audio and video session has been initiated. Additionally, the dynamic codec component of wireless device 150 may identify a type of audio session, a type of video session, or a type of audio and video session based on the input. For example, when the user initiates a session via a telephone application, the dynamic codec component may determine that the type of audio session is a voice call.

In block 410, criteria information is obtained. For example, the dynamic codec component of wireless device 150 may obtain criteria information. As previously described, the criteria information may include downlink conditions, uplink conditions, network conditions, and/or network codec preferences. According to an exemplary implementation, the dynamic codec component estimates uplink conditions based on a lookup of uplink estimation table 500. According to another exemplary implementation, the dynamic codec component obtains uplink condition values from network device 110 of wireless network 105.

In block 415, a list of codecs is selected based on the criteria information. For example, the dynamic codec component selects a list of codecs based on a lookup of codec list table 600.

In block 420, the list of codecs is transmitted to another device. For example, wireless device 150 transmits the list of codecs to another device with which wireless device 150 is to establish the session. By way of further example, wireless device 150 may transmit a SIP INVITE with an SDP offer, which carries the selected list of codecs.

In block 425, a response from the other device is received in which the response indicates a selection of a codec from the list of codecs. For example, wireless device 150 receives a response from the other device with which wireless device 150 is to establish the session. By way of further example, wireless device 150 may receive a SIP 200 OK and an SDP Answer, which carries the selected codec.

In block 430, the selected codec is used by the device and the other device during the session. For example, wireless device 150 and the other device establish a session and use the selected codec to transmit and/or receive data.

Although FIG. 4A illustrates an exemplary dynamic codec negotiation process 400, according to other embodiments, process 400 may include additional operations, fewer operations, and/or different operations than those illustrated in FIG. 4A, and as described herein. For example, with respect to block 425, wireless device 150 may determine whether the response includes terminating side information. When the response does include terminating side information, wireless device 150 may select another list of codecs based on the terminating side information received, as described herein. When the response does not include terminating side information, wireless device 150 proceeds to block 430, as set forth in FIG. 4A, block 430.

According to an exemplary embodiment, dynamic codec component stores historical information pertaining to whether a terminating device provides terminating side information. For example, in the case of VoLTE calls, a user of a wireless device may regularly call his or her friend. The friend's wireless device may or may not provide terminating side information. In the event that the friend's wireless device provides terminating side information, the dynamic codec component may store this information. Alternatively, this information may be stored in relation to the user's contact list. In this way, the dynamic codec component of the wireless device may expect terminating side information when the user initiates a VoLTE session with the friend.

Based on the historical information, according to an exemplary embodiment, the dynamic codec component may not transmit a list of codecs with the initial SIP INVITE and SDP offer since the dynamic codec component will select a list of codecs once the terminating side information is obtained. Alternatively, according to another exemplary embodiment, the dynamic codec component may select a "dummy" codec list (or other data, such as a request for terminating side information) and transmit that "dummy" codec list or other data with the initial SIP INVITE and SDP offer. In either implementation, the dynamic codec component may reduce resource utilization (e.g. processing, etc.) in selecting an initial codec list, as well as expedite the dynamic codec negotiation process. According to an exemplary implementation, the "dummy" codec list is stored in codec list table 600.

Figure 4B:
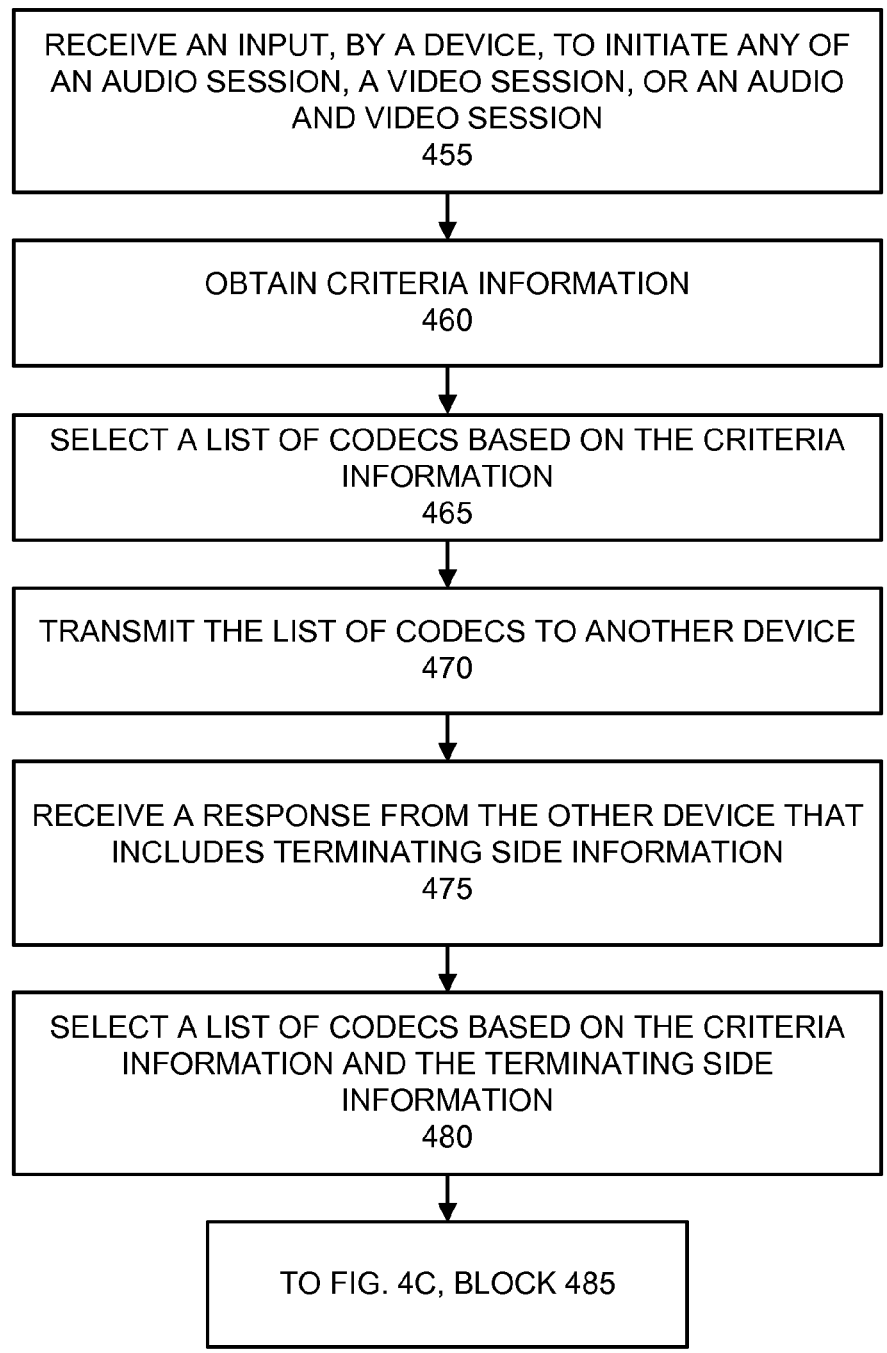
FIGS. 4B and 4C are flow diagrams that illustrate another exemplary process pertaining to dynamic codec negotiation.
Figure 4C:
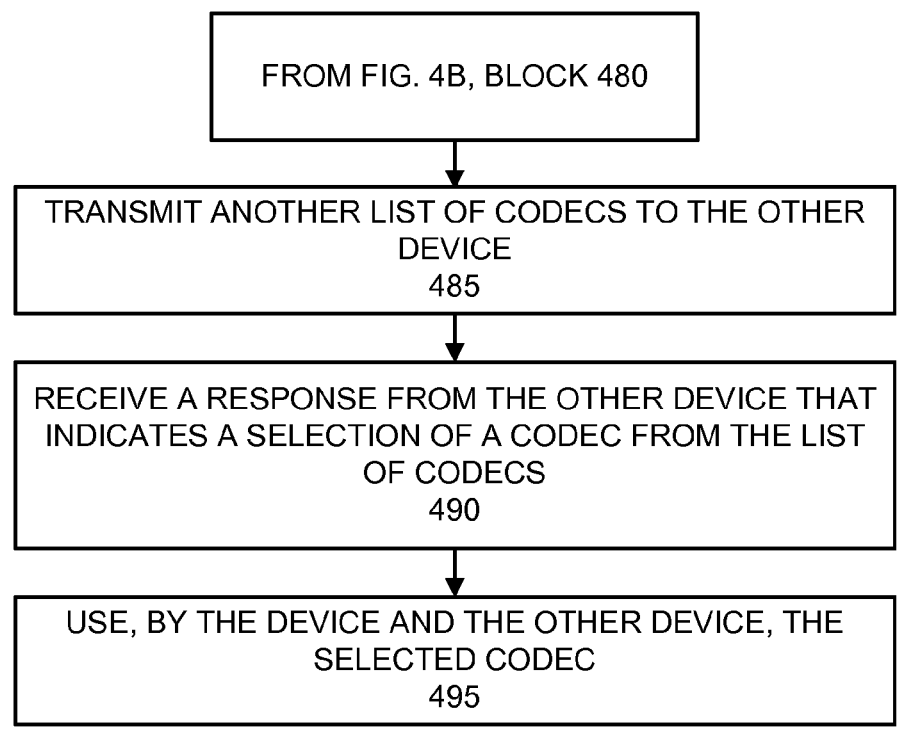

FIGS. 4B and 4C are flow diagrams that illustrate an exemplary process 450 pertaining to dynamic codec negotiation. Process 450 is directed to a process previously described above with respect to FIGS. 2A-2F and elsewhere in this description, in which a list of codecs is selected based on various criteria for presentment to a device during a codec negotiation. For example, process 450 is directed to an exemplary embodiment in which dynamic codec negotiation is performed based on receiving terminating side information. According to an exemplary embodiment, wireless device 150 performs the steps described in process 450. For example, processor 305 may execute software 315 to provide a dynamic codec service.

Since block 455 through 470 of FIG. 4B are similar to blocks 405 through 420 of FIG. 4A, a description of these steps will not be reiterated for the sake of brevity. Referring to block 475 of process 450, and in contrast to process 400, a response is received from the other device that includes terminating side information. By way of example, the response may be a SIP 200 OK and an SDP Answer, which carries the terminating side information. According to another example, the response may be a SIP 183 Progress response, which carries the terminating side information.

In block 480, a list of codecs is selected based on the criteria information and the terminating side information. For example, the dynamic codec component selects another list of codecs (or an initial list of codecs when a dummy codec list or other data is transmitted in block 470) based on a lookup of codec list table 600.

Referring to FIG. 4C, block 485, the list of codecs is transmitted to another device. For example, wireless device 150 transmits the list of codecs to another device with which wireless device 150 is to establish the session. By way of further example, wireless device 150 may transmit a SIP INVITE with an SDP offer, which carries the selected list of codecs.

Since blocks 490 and 495 of FIG. 4C are similar to blocks 425 and 430 of FIG. 4A, a description of these steps will not be reiterated for the sake of brevity.

Although FIGS. 4B and 4C illustrate an exemplary dynamic codec negotiation process 450, according to other embodiments, process 450 may include additional operations, fewer operations, and/or different operations than those illustrated in FIGS. 4B and 4C, and as described herein. For example, with respect to block 475, wireless device 150 may determine whether the response includes terminating side information. Additionally, or alternatively, historical information may be used such that a dummy codec list or other data may be transmitted in block 470, as previously mentioned.

In view of the foregoing, exemplary embodiments of dynamic codec negotiation may improve the chances that a session is established and maintained since the selection of a list of codecs is based on various criteria, as described herein.

The foregoing description of embodiments provides illustration, but is not intended to be exhaustive or to limit the embodiments to the precise form disclosed. Various modifications and changes may be made thereto, and additional embodiments may be implemented, without departing from the broader scope of the invention as set forth in the claims that follow. The specification and drawings are accordingly to be regarded as illustrative rather than restrictive. For example, according an exemplary embodiment, a wireless device may initiate a re-negotiation of codecs, during the session, when wireless conditions and/or network conditions change. By way of further example, when downlink conditions and/or network congestion levels are poor, the wireless device may select another list of codecs that mapped to the changed conditions, and transmit the list of codecs to the other device. According to an exemplary implementation, when the wireless device receives a request for TTI bundling from the wireless network (e.g., eNB), the received request may serve as a trigger to the wireless device to re-negotiate codecs with another device.

Additionally, exemplary embodiments of dynamic codec negotiation may form a basis for improved network resource utilization. For example, according to one approach, a wireless network may use TTI bundling when a wireless device enters a radio frequency (RF) condition that is below a threshold for a given codec in view of the attributes (e.g., error correction, etc.) afforded by the codec. Without interaction between a higher layer (e.g., above the physical layer and/or the media access control (MAC) layer), which may identify the codec being used during a session, and a lower layer, which may enable certain low level error correction and redundancy (e.g., such as TTI bundling), network resource utilization may be sub-optimal. According to an exemplary embodiment, the wireless network may dynamically operate according to the codec being used. By way of example, the wireless network may hold in abeyance the use of TTI bundling when a codec, which is being used during a session, affords a high error correction. Since the dynamic codec negotiation provides for the selection of a codec that best suits the wireless conditions and/or network conditions at the time the session is initiated, as well as re-negotiation during the session, the wireless network may improve network resource utilization by relying on the attributes of the codec.

Additionally, for example, Hybrid Automatic Repeat Request (HARQ) processes may be adapted to the codec in use. For example, according to one approach, the HARQ process may ensure a certain target residual BLER based on an initial block error rate associated with a first transmission. The parameters under control include retransmission, transport block size (TBS), MCS, and assignment and physical resource block (PRB) allocation for the wireless device. A network device of the wireless network may calculate these parameters based on CQI feedback, uplink RF conditions, packet buffer size, etc. However, the network device may relax the target residual BLER, based on identifying the codec being used during a session. For example, a radio resource management module of an eNB may save layer 2 resources pertaining to scheduling based on the identification of the codec being used during a session and the attributes of the codec that stem therefrom.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4A-4C, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
   storing, by a device, data that provides mappings between criteria information and lists of codecs, wherein the criteria information include threshold values pertaining to downlink wireless conditions and threshold values pertaining to levels of congestion in a wireless network;
   receiving, by the device, an indication that one of an audio session, a video session, or an audio and video session is to be initiated with another device;
   obtaining, by the device, one or more criteria metric values in response to the receiving, wherein the one or more criteria metric values are based on downlink measurements performed by the device and a network congestion value obtained from the wireless network;
   selecting, by the device, one of the lists of codecs from the data based on one of the mappings and the one or more criteria metric values, wherein the one of the lists of codecs indicates multiple codecs;
   transmitting, by the device, the one of the lists of codecs to the other device via the wireless network;
   receiving, by the device, a response, via the wireless network, from the other device, wherein the response indicates one of the multiple codecs; and
   using, by the device, the one of the multiple codecs during the one of the audio session, the video session, or the audio and video session.

2. The method of claim 1, further comprising:
   storing historical data that indicates whether the other device provides downlink measurements performed by the other device and a network congestion value obtained from the other device.

3. The method of claim 1, further comprising:
   receiving, by the device, downlink control information from the wireless network; and
   estimating, by the device, an uplink metric value based on the downlink control information and the downlink measurements, wherein the one or more criteria metric values includes the uplink metric value, and wherein the criteria information includes threshold values pertaining to uplink wireless conditions.

4. The method of claim 1, further comprising:
   determining, by the device, whether the response includes one or more criteria metric values from the other device, wherein the one or more criteria metric values from the other device are based on downlink measurements performed by the other device and a network congestion value obtained from the other device.

5. The method of claim 1, wherein the criteria information includes network codec preferences that indicate preferred codecs of the wireless network, and the method further comprising:

obtaining, by the device, preference data that indicates a preferred codec of the wireless network; and selecting, by the device, the one of the lists of codecs from the data based on the one of the mappings, the one or more criteria metric values, and the preference data.

6. The method of claim 1, further comprising:

identifying, by the device, a type of the audio session or a type of the audio and video session, wherein identifying the type of the audio session includes identifying whether the audio session is a voice call or music, and wherein identifying the type of the audio and video session includes identifying whether the audio and video session includes an audio and video conference session or a program session; and selecting, by the device, the one of the lists of codecs from the data based on the one of the mappings, the one or more criteria metric values and, the type of the audio session or the type of the audio and video session.

7. The method of claim 1, further comprising:

transmitting, by the device, a request for an uplink metric value measured by a network device of the wireless network;

receiving, by the device, the uplink metric value from the wireless network; and selecting, by the device, the one of the lists of codecs from the data based on the one of the mappings, the one or more criteria metric values, wherein the one or more criteria metric values include the uplink metric value.

8. The method of claim 1, further comprising:

obtaining, by the device, another one or more criteria metric values that include a request for Transmission Time Interval (TTI) bundling; and re-negotiating, by the device, a use of another codec during the one of the audio session, the video session, or the audio and video session based on the other one or more criteria metric values, wherein the re-negotiating comprises:

selecting, by the device, another one of the lists of codecs from the data based on another one of the mappings and the other one or more criteria metric values, wherein the other one of the lists of codecs indicates multiple codecs; and transmitting, by the device, the other one of the lists of codecs to the other device via the wireless network.

9. A device comprising:

a communication interface;

a memory, wherein the memory stores instructions; and a processor, wherein the processor executes the instructions to:

store data that provides mappings between criteria information and lists of codecs wherein the criteria information include threshold values pertaining to downlink wireless conditions and threshold values pertaining to levels of congestion in a wireless network;

receive an indication that one of an audio session, a video session, or an audio and video session is to be initiated with another device;

obtain one or more criteria metric values in response to a receipt of the indication, wherein the one or more criteria metric values are based on downlink measurements performed by the device and a network congestion value obtained from the wireless network;

select one of the lists of codecs from the data based on one of the mappings and the one or more criteria metric values, wherein the one of the lists of codecs indicates multiple codecs;

transmit, via the communication interface, the one of the lists of codecs to the other device via the wireless network;

receive, via the communication interface, a response, via the wireless network, from the other device, wherein the response indicates one of the multiple codecs; and use the one of the multiple codecs during the one of the audio session, the video session, or the audio and video session.

10. The device of claim 9, wherein the processor further executes the instructions to:

store historical data that indicates whether the other device provides downlink measurements performed by the other device and a network congestion value obtained from the other device.

11. The device of claim 9, wherein the processor further executes the instructions to:

receive, via the communication interface, downlink control information from the wireless network; and estimate an uplink metric value based on the downlink control information and the downlink measurements, wherein the one or more criteria metric values includes the uplink metric value, and wherein the criteria information includes threshold values pertaining to uplink wireless conditions.

12. The device of claim 9, wherein the processor further executes the instructions to:

determine whether the response includes one or more criteria metric values from the other device, wherein the one or more criteria metric values from the other device are based on downlink measurements performed by the other device and a network congestion value obtained from the other device.

13. The device of claim 9, wherein the criteria information includes network codec preferences that indicate preferred codecs of the wireless network, and wherein the processor further executes the instructions to:

obtain preference data that indicates a preferred codec of the wireless network; and select the one of the lists of codecs from the data based on the one of the mappings, the one or more criteria metric values, and the preference data.

14. The device of claim 9, wherein the processor further executes the instructions to:

transmit, via the communication interface, a request for an uplink metric value measured by a network device of the wireless network;

receive, via the communication interface, the uplink metric value from the wireless network; and wherein when selecting, the processor further executes the instructions to select to:

select the one of the lists of codecs from the data based on the one of the mappings, the one or more criteria metric values, wherein the one or more criteria metric values include the uplink metric value.

15. The device of claim 9, wherein the processor further executes the instructions to:

obtain an update of one or more criteria metric values during the one of the audio session, the video session, or the audio and video session; and re-negotiate a use of another codec during the one of the audio session, the video session, or the audio and video session, wherein when re-negotiating, the processor executes the instructions to:

select another one of the lists of codecs from the data based on another one of the mappings and the other one or more criteria metric values, wherein the other one of the lists of codecs indicates multiple codecs; and transmit, via the communication interface, the other one of the lists of codecs to the other device via the wireless network.

16. A non-transitory storage medium that stores instructions executable by a processor of a computational device to:

store data that provides mappings between criteria information and lists of codecs wherein the criteria information include threshold values pertaining to downlink wireless conditions and threshold values pertaining to levels of congestion in a wireless network;

receive an indication that one of an audio session, a video session, or an audio and video session is to be initiated with another device;

obtain one or more criteria metric values in response to a receipt of the indication wherein the one or more criteria metric values are based on downlink measurements performed by the device and a network congestion value obtained from the wireless network;

select one of the lists of codecs from the data based on one of the mappings and the one or more criteria metric values, wherein the one of the lists of codecs indicates multiple codecs;

transmit the one of the lists of codecs to the other device via the wireless network;

receive a response, via the wireless network, from the other device, wherein the response indicates one of the multiple codecs; and use the one of the multiple codecs during the one of the audio session, the video session, or the audio and video session.

17. The non-transitory storage medium of claim 16, further storing instructions executable by the processor of the computational device to:

determine whether the response includes one or more criteria metric values from the other device, wherein the one or more criteria metric values from the other device are based on downlink measurements performed by the other device and a network congestion value obtained from the other device.

18. The non-transitory storage medium of claim 16, further storing instructions executable by the processor of the computational device to:

receive downlink control information from the wireless network; and estimate an uplink metric value based on the downlink control information and the downlink measurements, wherein the one or more criteria metric values includes the uplink metric value, and wherein the criteria information includes threshold values pertaining to uplink wireless conditions.

19. The non-transitory storage medium of claim 16, further storing instructions executable by the processor of the computational device to:

store historical data that indicates whether the other device provides downlink measurements performed by the other device and a network congestion value; and generate a message that carries the one of the lists of codecs based on the historical data.

20. The non-transitory storage medium of claim 16, further storing instructions executable by the processor of the computational device to:

transmit a request for an uplink metric value measured by a network device of the wireless network;

receive the uplink metric value from the wireless network; and wherein the instruction to select further store instructions to:

select the one of the lists of codecs from the data based on the one of the mappings, the one or more criteria metric values, wherein the one or more criteria metric values include the uplink metric value.

* * * * *